Dec. 22, 1964  M. KLEFFMAN  3,162,484

FURNITURE-ENSEMBLE RETAINING DEVICE

Filed Sept. 20, 1963

INVENTOR
MILDRED KLEFFMAN
BY
Snow ATTYS.

United States Patent Office 3,162,484
Patented Dec. 22, 1964

3,162,484
FURNITURE-ENSEMBLE RETAINING DEVICE
Mildred Kleffman, 8600 Wolf Road, Rte. 1,
Hinsdale, Ill.
Filed Sept. 20, 1963, Ser. No. 310,348
1 Claim. (Cl. 297—248)

This invention relates to a device for use in retaining the ensemble relationship of sectional furniture.

As is well-known with living-room sectional furniture a problem often is experienced in retaining the ensemble relationship of the pieces of sectional furniture during the conventional use thereof.

The main objects of this invention are to provide an improved device for facile and effective use in retaining the ensemble of two pieces of sectional furniture to simulate a one-piece unit; to provide an improved device of this kind which can be inconspicuously arranged to embrace the juxtaposed legs of the two pieces of sectional furniture to prevent the same from accidently shifting away from each other; and to provide an improved device of this kind of very simple and inexpensive form composed of two identically-shaped flexible pieces of material adapted for adjustable spacing for embracive positioning on the opposed legs of the two pieces of furniture.

Figure 1:
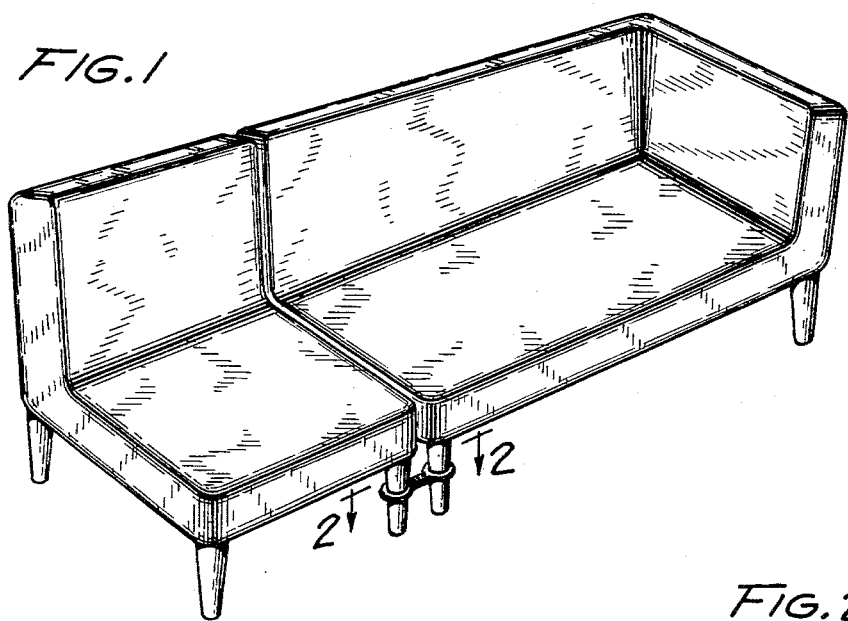
FIGURE 1 is a perspective view of an ensemble of two conventional pieces of sectional furniture simulating a comparable single unit, the opposed legs of which two units are tied together by a retaining device constructed in accordance with this invention.
Figure 2:
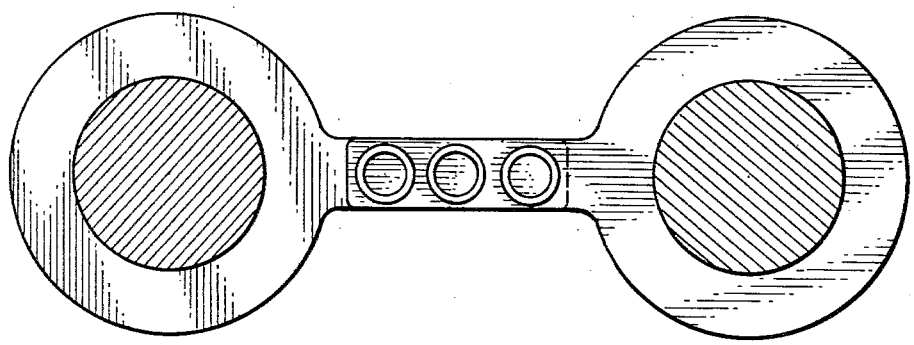
FIG. 2 is a plan view of ensemble-retaining device constructed in accordance with this invention.
Figure 3:
FIG. 3 is an edge view of the same.
Figure 4:
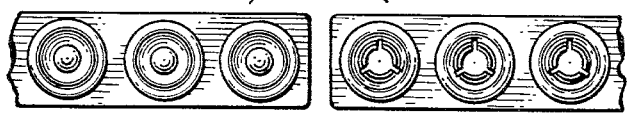
FIG. 4 is an inner face view of the separated ends of the two-piece retaining device, showing the arrangement of the separable fasteners thereon.

The essential concept of this invention is to prevent accidental shifting of adjacent pieces of sectional furniture away from each other and involves a pair of parts, formed to embrace legs of the furniture, spanned by a spacing strip mounting separate fasteners to permit varying the distance between the leg-embracing parts.

A device embodying the foregoing concept comprises two identically-formed parts 6 and 7 mounting a plurality of pairs of fasteners 8 adapted for selective connection to alter the radial spacing of the parts 6 and 7.

Each of the parts 6 and 7, as here shown, is die-cut from a flat, comparatively thin material to form a ring section 9 with an integrated radially-disposed spacing strip 10. The material from which these parts 6 and 7 are formed preferably is rubber or its comparable synthetic equivalent. Each ring section 9 is dimensioned to provide an opening which will permit embracive positioning on a conventional-size leg of modern sectional furniture. For the specimens here illustrated the outside diameter of the ring section 9 is approximately 2½ inches and the inside diameter is approximately 1½ inches. The spacing strip 10 will measure between 1¾ inches and 2 inches in length.

The fasteners 8, as here shown, are the conventional snap-type, commonly used on garments. One element 11 is in the form of a ring wherein an inner radially-split flange provides a socket 12. The other element 13 is in the form of a disk with a central upstanding knob 14 dimensioned to be retentatively depressed into the socket 12 of the element 11. When the elements 11 and 13 are thus connected they will remain so for any reasonable strain applied to the spacing strip 10.

Figure 5:
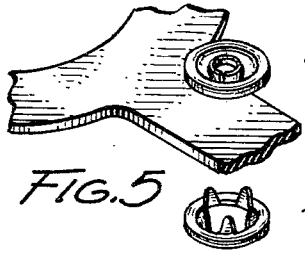
FIG. 5 is an enlarged view of one of the snap fasteners and the pronged-ring whereby the fasteners parts are anchored to the retaining device.

Each of these elements 11 and 13 is secured to the respective spacing strip 10 by a pronged ring 15 (FIG. 5). These rings 15 have the prongs pressed through the spacing strip 10 into contact with the respective element 11 or 13 whereupon the prongs are bent to engage the respective element and firmly secure it to the respective strip 10.

In this particular adaptation, three such fasteners 8 are fixed on the opposed faces of the spacing strips 10, in equally-spaced relationship. More pairs of fasteners 8 could be arranged on these spacing strips 10 if desired. The three pairs of fasteners 8 being of uniform spacing makes it possible to arrange any one of five different spacings of the ring sections 9 of the two parts 6 and 7, when embracing the tapered legs of a sectional-furniture ensemble, such as shown in FIG. 1. Those five different spacings range from the snapping together of two fasteners 8 nearest the respective ring sections 9 of the parts 6 and 7 to the snapping together of the two fasteners 8 farthest from these respective ring sections 9.

As illustrated in FIG. 1, two units 16 and 17 are arranged as in ensemble. Thus, the front legs 18 and 19, on the respective units are juxtaposed. As here shown, they are embraced by the ring sections 9 of the respective parts 6 and 7, with the spacing strips 10 secured in overlapping relationship by the appropriate snapping together of the fasteners 10. Obviously, another such retaining device might generally be arranged on the rear legs of these two units 16 and 17.

Having thus provided for the retention of these two units 16 and 17 as an ensemble, it will be very unlikely for them to be separated in the normal use thereof.

Although but one specific embodiment of this invention is herein shown and described it will be understood that details of the construction shown may be altered or omitted without departing from the spirit of the invention as defined by the following claim.

I claim:

A device, for retaining the juxtaposed ensemble relationship of two pieces of sectional furniture, comprising a pair of ring parts formed of flexible material of rubber, or its equivalent, and dimensioned to fit over the opposed legs of the ensemble pieces, each ring part having a radially-disposed integrated spacing strip, and separable fasteners fixed on the respective strips comprising a plurality of the conventional two-unit snap-type respectively fixed in uniform spacing along the respective strips to permit one or more of the pair of fasteners to be connected together to vary the radial spacing of the ring parts, to accommodate variable distances between the opposed legs of the ensemble.

References Cited by the Examiner

UNITED STATES PATENTS

| | | | |
|---|---|---|---|
| 712,898 | 11/02 | Barney | 297—248 |
| 988,513 | 4/11 | Shea et al. | 297—233 |
| 1,290,433 | 1/19 | Walker | 248—360 |
| 1,825,055 | 9/31 | De Bretteville | 297—233 |
| 2,375,147 | 5/45 | Teague | 24—90 |
| 2,591,875 | 4/52 | Robbins | 297—385 |
| 2,625,986 | 1/53 | Siff | 297—170 |
| 2,677,834 | 5/54 | Moynihan | 5—336 |
| 3,002,787 | 10/61 | Ziegenfuss | 297—249 |
| 3,082,034 | 3/63 | Silver | 297—440 |

FOREIGN PATENTS 632,397  12/61  Canada.

FRANK B. SHERRY, *Primary Examiner.*